United States Patent
Camp et al.

(10) Patent No.: US 9,569,118 B2
(45) Date of Patent: Feb. 14, 2017

(54) PROMOTING CONSISTENT RESPONSE TIMES IN A DATA STORAGE SYSTEM HAVING MULTIPLE DATA RETRIEVAL MECHANISMS

(71) Applicant: INTERNATIONAL BUSINESS MACHINES CORPORATION, Armonk, NY (US)

(72) Inventors: Charles J. Camp, Sugar Land, TX (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 14/586,291

(22) Filed: Dec. 30, 2014

(65) Prior Publication Data

US 2016/0188223 A1    Jun. 30, 2016

(51) Int. Cl.
*G06F 3/06*    (2006.01)
*G06F 12/08*    (2016.01)

(52) U.S. Cl.
CPC ........... *G06F 3/0613* (2013.01); *G06F 3/0653* (2013.01); *G06F 3/0656* (2013.01); *G06F 3/0659* (2013.01);
(Continued)

(58) Field of Classification Search
CPC .................. G06F 11/1076–11/1096; G06F 3/061–3/0613; G06F 3/0683–3/0689; G06F 2212/1024
(Continued)

(56) References Cited

U.S. PATENT DOCUMENTS 8,555,288 B2    10/2013    Brown et al.
2013/0262762 A1 *    10/2013    Igashira .................. G06F 12/00
                                                                        711/114
(Continued)

FOREIGN PATENT DOCUMENTS

WO    2008017026 A1    2/2008

OTHER PUBLICATIONS

Vineetha, V. "Performance monitoring in cloud." Infosys View-Point (2012).

(Continued)

*Primary Examiner* — Nicholas Simonetti
(74) *Attorney, Agent, or Firm* — Brian F. Russell; Randall J. Bluestone (57) ABSTRACT

A data storage system includes a higher level controller, a lower level controller, and a plurality of storage components including a particular storage component. Data is stored within the data storage system utilizing at least one level of striping across the plurality of storage components. Latencies of input/output operations (IOPs) requesting access to the data stored within the data storage system are monitored. In response to determining that a latency of a read IOP requesting read data stored in the particular storage component exceeds a latency threshold and in absence of a data error, the read IOP is serviced by reconstructing the read data from storage components among the plurality of storage components other than the particular storage component. The lower level controller also provides feedback to the higher level controller to cause the higher level controller to reduce IOPs directed to at least the particular storage component.

20 Claims, 7 Drawing Sheets

(52) U.S. Cl.
CPC .......... *G06F 3/0688* (2013.01); *G06F 3/0689* (2013.01); *G06F 12/0806* (2013.01); *G06F 2212/1024* (2013.01); *G06F 2212/2022* (2013.01); *G06F 2212/62* (2013.01)

(58) Field of Classification Search
USPC .......................................................... 711/114
See application file for complete search history.

(56) References Cited

U.S. PATENT DOCUMENTS

| | | |
|---|---|---|
| 2013/0346594 A1 | 12/2013 | Banerjee et al. |
| 2014/0019701 A1 | 1/2014 | Ohira et al. |
| 2014/0019984 A1 | 1/2014 | Li et al. |
| 2014/0195760 A1 | 7/2014 | Iwamitsu et al. |
| 2014/0258647 A1 | 9/2014 | Maruyama |
| 2015/0019918 A1* | 1/2015 | Li ...................... G06F 11/1092 714/54 |

OTHER PUBLICATIONS

Citrix "Monitoring", Worldwide Consulting Solutions, White Paper, 2012, Citrix.

\* cited by examiner

PROMOTING CONSISTENT RESPONSE TIMES IN A DATA STORAGE SYSTEM HAVING MULTIPLE DATA RETRIEVAL MECHANISMS

BACKGROUND OF THE INVENTION

This disclosure relates to data processing and storage, and more specifically, to data storage systems, such as flash-based data storage systems, that employ multiple data retrieval mechanisms.

NAND flash memory is an electrically programmable and erasable non-volatile memory technology that stores one or more bits of data per memory cell as a charge on the floating gate of a transistor. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

NAND flash memory-based storage systems provide numerous benefits over conventional magnetic hard disk drive storage systems. These benefits include greater reliability, faster access times, and lower power consumption. In addition, NAND flash memory-based storage systems provide more consistent performance in that servicing input/output operations (IOPs) does not require any mechanical movement (e.g., a magnetoresistive head seeking the target sector of a magnetic disk), and therefore IOPs can generally all be serviced in approximately the same amount of time. Response times can begin to vary, however, in NAND flash memory-based storage systems as the number of pending IOPs increases, for example, due to queuing delays and delays attributable to the garbage collection process utilized to reclaim and consolidate valid data from memory blocks selected for erasure.

The present disclosure recognizes that although the average response time of a NAND flash memory-based storage system may remain relatively low in the presence of occasional accesses having longer response times, the inconsistency between IOP response times can contribute to undesirable host behavior, such as an application timing out while waiting on a long latency IOP to complete. Consequently, the present disclosure recognizes that it would be beneficial and desirable to promote a tighter distribution of IOP response times in a NAND flash memory-based storage system.

BRIEF SUMMARY

In at least one embodiment, a data storage system includes a higher level controller, a lower level controller, and a plurality of storage components including a particular storage component. Data is stored within the data storage system utilizing at least one level of striping across the plurality of storage components. Latencies of input/output operations (IOPs) requesting access to the data stored within the data storage system are monitored. In response to determining that a latency of a read IOP requesting read data stored in the particular storage component exceeds or will exceed a latency threshold and in absence of a data error, the read IOP is serviced by reconstructing the read data from storage components among the plurality of storage components other than the particular storage component. The lower level controller also provides feedback to the higher level controller to cause the higher level controller to reduce IOPs directed to at least the particular storage component.

DETAILED DESCRIPTION

Figure 1A:
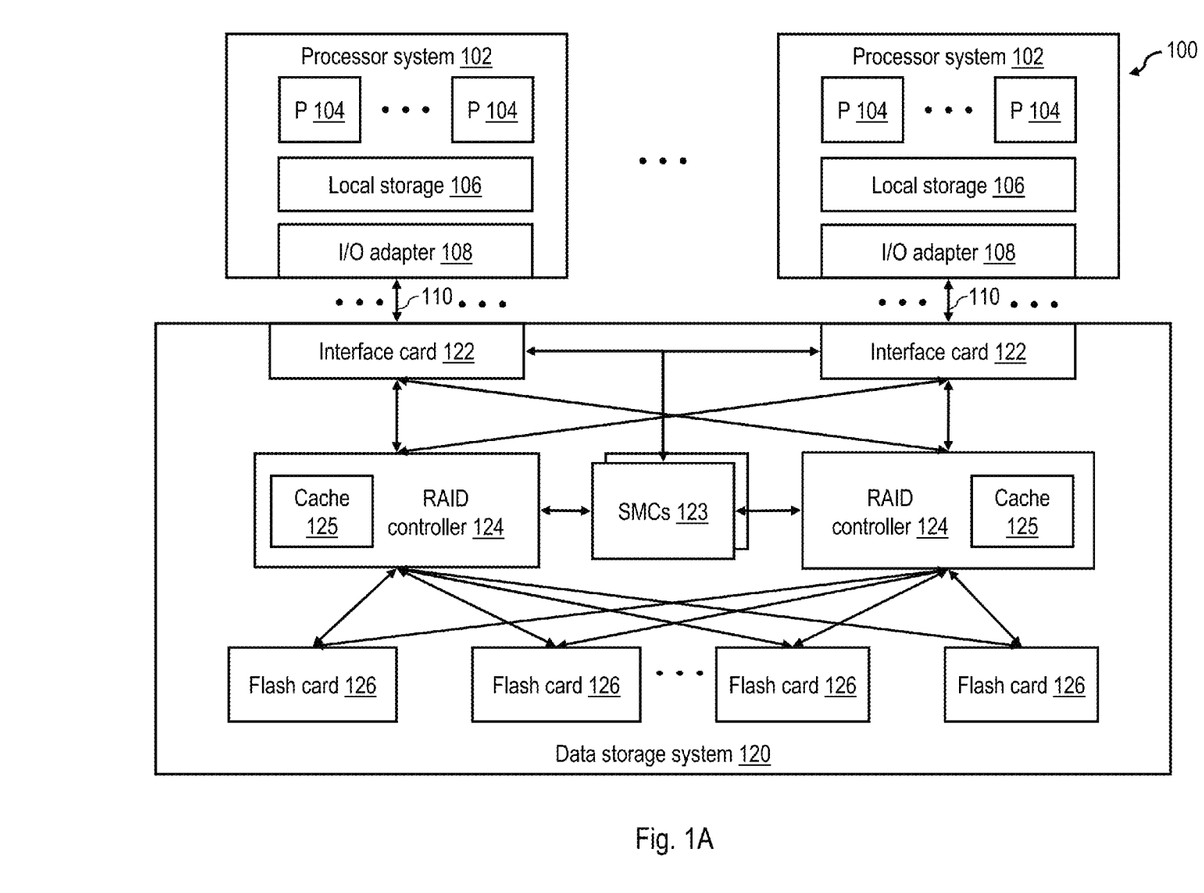
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. A processor system 102 may additionally include local storage 106 (e.g., dynamic random access memory (DRAM), flash memory, or disks) that may store program code, operands and/or execution results of the processing performed by processor(s) 104. In various embodiments, a processor system 102 can be, for example, a mobile computing device (such as a smartphone or tablet), a laptop or desktop personal computer system, a server computer system (such as one of the POWER series of servers available from International Business Machines Corporation), or a mainframe computer system. A processor system 102 can also be an embedded processor system using various processors such as ARM, PowerPC, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

Although not required, in the illustrated embodiment, data storage system 120 includes multiple interface cards 122 through which data storage system 120 receives and responds to IOPs received via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards 126 including, in this example, NAND flash storage media. In other embodiments, alternative and/or additional non-volatile storage devices can be employed. RAID controllers 124 preferably implement one or more selected data protection schemes, such as RAID 0, RAID 5 and/or RAID 6, either alone or in combination to distribute data across the multiple flash cards 126. As illustrated, each RAID controller 124 preferably includes a respective cache 125 that may be utilized to temporarily buffer write data of write IOPs until destaged to flash cards 126 and to source read data requested by read IOPs.

In the depicted embodiment, the overall operation of data storage system 120 is managed by redundant system management controllers (SMCs) 123, which are coupled to interface cards 122 and to RAID controllers 124. In various embodiments, system management controllers 123 can be implemented utilizing hardware or hardware executing management firmware and/or software.

Figure 1B:
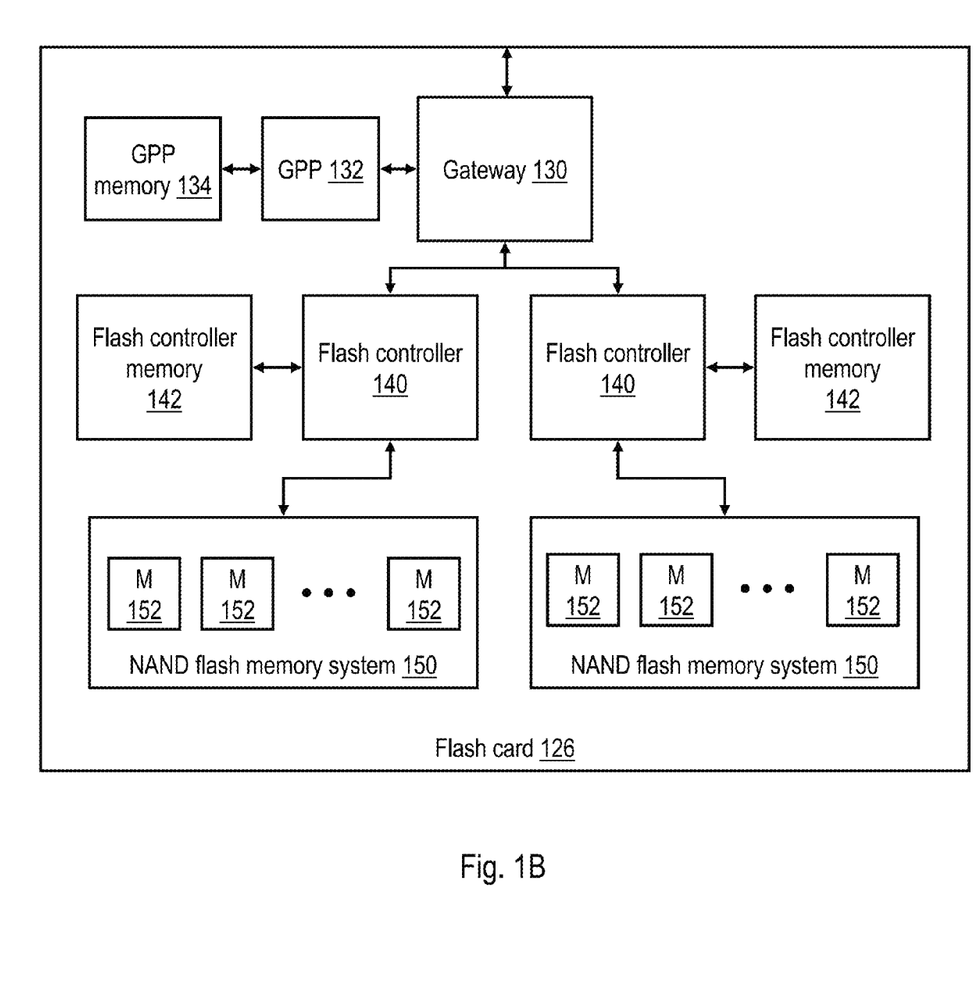
FIG. 1B is a more detailed block diagram of a flash card of the data storage system of FIG. 1A.

FIG. 1B depicts a more detailed block diagram of an exemplary embodiment of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform pre-processing on IOPs received by gateway 130 and/or to schedule servicing of the IOPs by flash card 126. GPP 132 is coupled to a GPP memory 134 (e.g., Dynamic Random Access Memory (DRAM)) that can conveniently buffer data created, referenced and/or modified by GPP 132 in the course of its processing or data flowing through the gateway 130 destined for one or more of the flash controllers 140.

Gateway 130 is further coupled to multiple flash controllers 140, each of which controls a respective NAND flash memory system 150. Flash controllers 140 can be implemented, for example, by an Application Specific Integrated Circuit (ASIC) and/or a Field Programmable Gate Array (FPGA) and/or a microprocessor, and each have an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read IOPs and write IOPs from gateway 130 that request to read data stored in NAND flash memory system 150 and/or to store data in NAND flash memory system 150. Flash controllers 140 service these IOPs, for example, by accessing NAND flash memory system 150 to read or write the requested data from or into NAND flash memory system 150 or by accessing a memory cache (not illustrated) associated with NAND flash memory system 150.

Flash controllers 140 implement a flash translation layer (FTL) that provides logical-to-physical address translation to enable access to specific memory locations within NAND flash memory systems 150. In general, an IOP received by flash controller 140 from a host device, such as a processor system 102, contains the logical block address (LBA) at which the data is to be accessed (read or written) and, if a write IOP, the write data to be stored to data storage system 120. The IOP may also specify the amount (or size) of the data to be accessed. Other information may also be communicated depending on the protocol and features supported by data storage system 120. The flash translation layer translates LBAs received from a RAID controller 124 into physical addresses assigned to corresponding physical location in NAND flash memory systems 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. In the embodiment shown in FIG. 1B, each NAND flash memory system 150 includes multiple (e.g., 32) individually addressable NAND flash memory storage devices 152, which are preferably distributed among multiple (e.g., 16) internal buses (channels) of NAND flash memory system 150. In the illustrated example, the flash memory storage devices 152 take the form of a board-mounted flash memory modules, for example, Single Level Cell (SLC), Multi-Level Cell (MLC), Three Level Cell (TLC), or Quad Level Cell (QLC) NAND flash memory modules.

Figure 2:
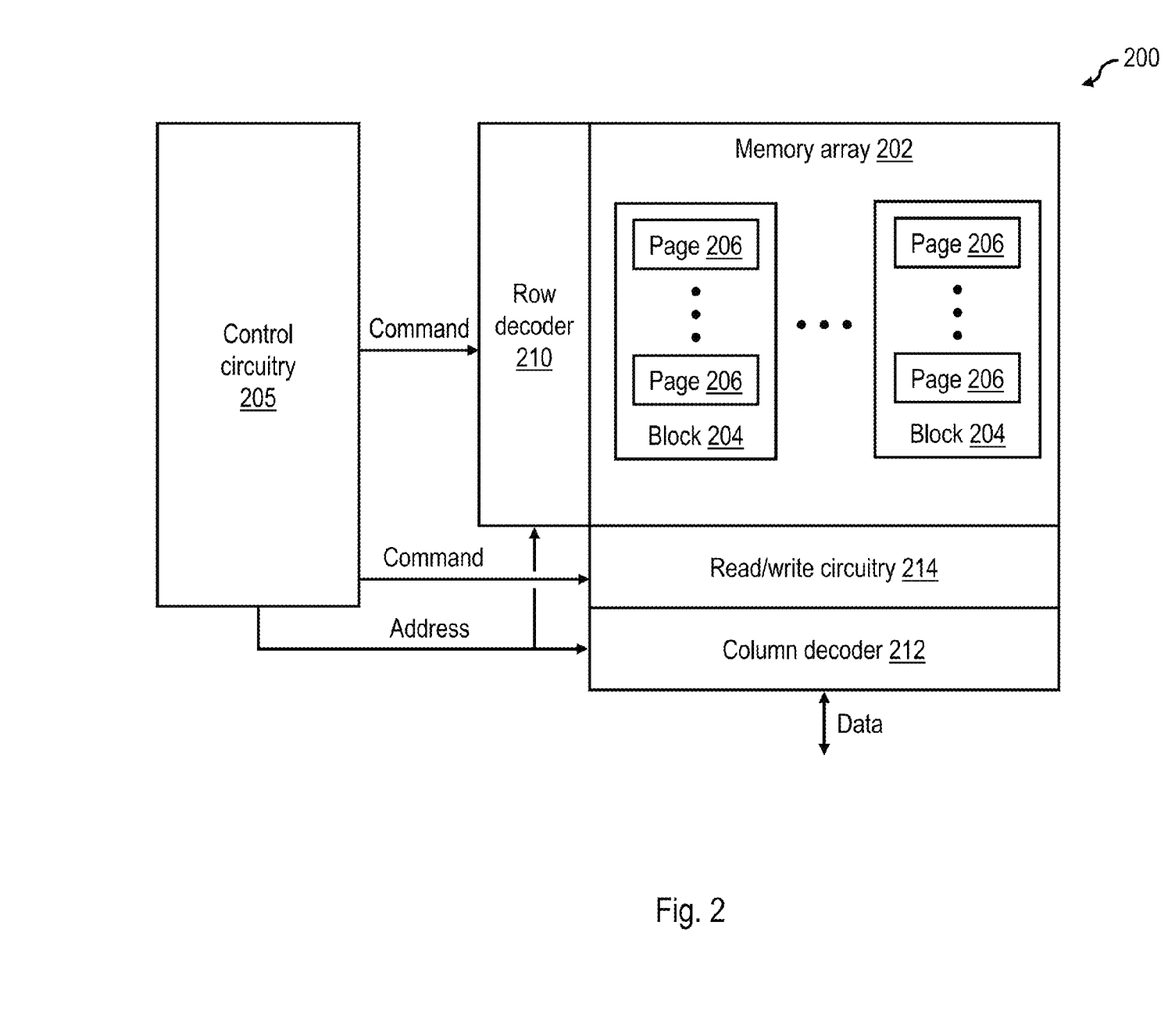
FIG. 2 depicts an exemplary NAND flash memory module in accordance with one embodiment.

Referring now to FIG. 2, there is depicted a block diagram of an exemplary flash memory module 200 that can be utilized to implement any of the NAND flash memory storage devices 152 of FIG. 1B. Flash memory module 200 includes one or more memory die, each implementing at least one memory array 202 formed of a two- or three-dimensional array of NAND flash memory cells. As indicated in FIG. 2, the memory cells within memory array 202 are physically arranged in multiple blocks 204, each in turn including multiple physical pages 206.

As is known to those skilled in the art, NAND flash memory, such as that employed in memory array 202, must be erased prior to being programmed. Further, NAND flash memory is generally constrained by its construction such that the smallest granule of storage that can be erased is a block 204 and the smallest granule of storage that can be accessed by a read or write IOP is fixed at the size of a single physical page 206. It should be appreciated in this regard that the LBAs provided by host devices correspond to logical pages within a logical address space, where each logical page typically has a size of 4 kilobytes (kB). Physical pages 206, in contrast, typically have a larger size, for example, 16 kB, and can thus correspond to multiple logical pages.

Flash memory module 200 further includes a row decoder 210 through which word lines of memory array 202 can be addressed and a column decoder 212 through which bit lines of memory array 202 can be addressed. In addition, flash memory module 200 includes read/write circuitry 214 that enables the memory cells of a physical page 206 to be programmed or read in parallel. Flash controller 200 additionally includes control circuitry 205 that provides chip-level control of operation of memory array 202, including read and write accesses made to physical pages 206 in memory array 202, erasure of blocks 204, and the amplitude, duration and polarity of related voltages applied to memory array 202.

Having described the general physical structure of one exemplary embodiment of a data storage system 120, certain operational aspects of data storage system 120 are now described with reference to FIG. 3, which is a high level flow diagram of some of the flash management functions and data structures employed by a GPP 132 and/or flash controller 140 in accordance with one embodiment.

Data storage system 120 does not generally allow external devices (e.g., hosts) to directly address and/or access the physical memory locations within NAND flash memory systems 150. Instead, data storage system 120 is generally configured to present to host devices one or more logical volumes each having a contiguous logical address space, thus allowing host devices to read and write data to and from LBAs within the logical address space while permitting one or more of the various levels of controllers (e.g., system management controller 123, RAID controllers 124, and flash controllers 140 and GPPs 132) to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 performs logical-to-physical address translation for an associated set of LBAs using a logical-to-physical address translation data structure, such as logical-to-physical translation (LPT) table 300, which can be stored, for example, in the associated flash controller memory 142. It is important to note that the logical address supplied to flash controller(s) 140 may be different from the logical address originally supplied to data storage system 120, since various components within data storage system 120 may perform address translation operations between the external devices and the flash controller(s) 140.

Flash management code running on the GPP 132 tracks erased blocks of NAND flash memory system 150 that are ready to be used in ready-to-use (RTU) queues 306, which may be stored, for example, in GPP memory 134. In the depicted embodiment, flash management code running on the GPP 132 maintains one RTU queue 306 per channel (i.e., per data bus within the associated NAND flash memory system 150), and an identifier of each erased block that is to be reused is enqueued in the RTU queue 306 corresponding to its channel. A build block stripes function 320 performed by flash management code running on the GPP 132 constructs new block stripes for storing data and associated parity information from the erased blocks enqueued in RTU queues 306. The new block stripes are then queued to the flash controller 140 for data placement. Block stripes are preferably formed of blocks residing in NAND flash memory storage devices 152 connected to different channels, meaning that build block stripes function 320 can conveniently construct a block stripe by drawing each block of the new block stripe from a different RTU queue 306. In general, build block stripes function 320 attempts to construct stripes from blocks of approximately equal health (i.e., expected remaining useful life).

In response to write IOP received from a host, such as a processor system 102, a data placement function 310 of flash controller 140 determines by reference to LPT table 300 whether the target LBA(s) indicated in the write request is/are currently mapped to physical memory page(s) in NAND flash memory system 150 and, if so, changes the status of each data page currently associated with a target LBA to indicate that the associated data is no longer valid. In addition, data placement function 310 allocates a page stripe if necessary to store the write data of the write IOP and any non-updated data (i.e., for write requests smaller than a logical page, the remaining valid data from a previous write to the same logical address which is not being overwritten and which must be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The newly allocated page stripe, which can include, for example, one page 206 from each of a plurality of different NAND flash memory storage devices 152, may be allocated from either a block stripe already allocated to hold data or from a new block stripe built by build block stripes function 320. In a preferred embodiment, the page stripe allocation can be based on the health of the blocks available for allocation and the "heat" (i.e., estimated or measured write access frequency) of the LBA of the write data.

Data placement function 310 then writes the write data and associated metadata (e.g., cyclic redundancy code (CRC) and error correcting code (ECC) values, and parity information for the page stripe) in the allocated page stripe. As will be appreciated, flash controller 140 may employ one or more of a variety of different data protection schemes to protect the data pages within the page stripe, including, for example, RAID, 0, RAID 5 and/or RAID 6. Thus, in at least one embodiment, data storage system 120 preferably employs multiple layers of data protection schemes, including one or more levels of RAID implemented across flash cards 126 by higher level controller(s) (e.g., RAID controller 124) and one or more levels of RAID implemented across NAND flash memory storage device 152 by lower level controller(s) (e.g., flash controllers 140 and/or GPPs 132). Flash controller 140 also updates LPT table 300 to associate the physical page(s) utilized to store the write data with the LBA(s) indicated by the host device. Thereafter, flash controller 140 can access the data to service host read IOPs by reference to LPT table 300 as further illustrated in FIG. 3.

Once all pages in a block stripe have been written, flash controller 140 places the block stripe into one of occupied block queues 302, which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 312. Garbage collector 312 selects particular block stripes for garbage collection based on a number of factors including, for example, the health of the blocks 204 within the block stripes and how much of the data within the erase blocks 204 is invalid. In the illustrated example, garbage collection is performed on entire block stripes, and flash management code running on GPP 132 logs the block stripes ready to be recycled in a relocation queue 304, which can conveniently be implemented in the associated flash controller memory 142 or GPP memory 134.

The flash management functions performed by GPP 132 or flash controller 140 additionally include a relocation function 314 that relocates the valid data held in block stripes enqueued in relocation queue 304. To relocate such valid data, relocation function 314 updates LPT table 300 to remove the current association between the logical and physical addresses of the data. In addition, relocation function 314 issues relocation write requests to data placement function 310 to request that the valid data of the old block stripe be written to a new block stripe in NAND flash memory system 150. Once all remaining valid data has been moved from the old block stripe, the old block stripe is passed to dissolve block stripes function 316, which decomposes the old block stripe into its constituent blocks 204, thus disassociating the blocks 204. Each of the blocks 204 formerly forming the dissolved block stripe is then erased under the direction of flash controller 140 and/or the control circuitry 205 of the relevant flash memory module 200, and a corresponding program/erase (P/E) cycle count for each erased block is incremented. Based on the health metrics of each erased block 204 (e.g., bit error rate (BER) metrics, uncorrectable errors, P/E cycle count, etc.), each erased block 204 is either retired (i.e., withdrawn from use) by a block retirement function 318 among the flash management functions executed on GPP 132, or alternatively, prepared for reuse by placing the block 204 on the appropriate ready-to-use (RTU) queue 306 in the associated GPP memory 134.

Figure 3:
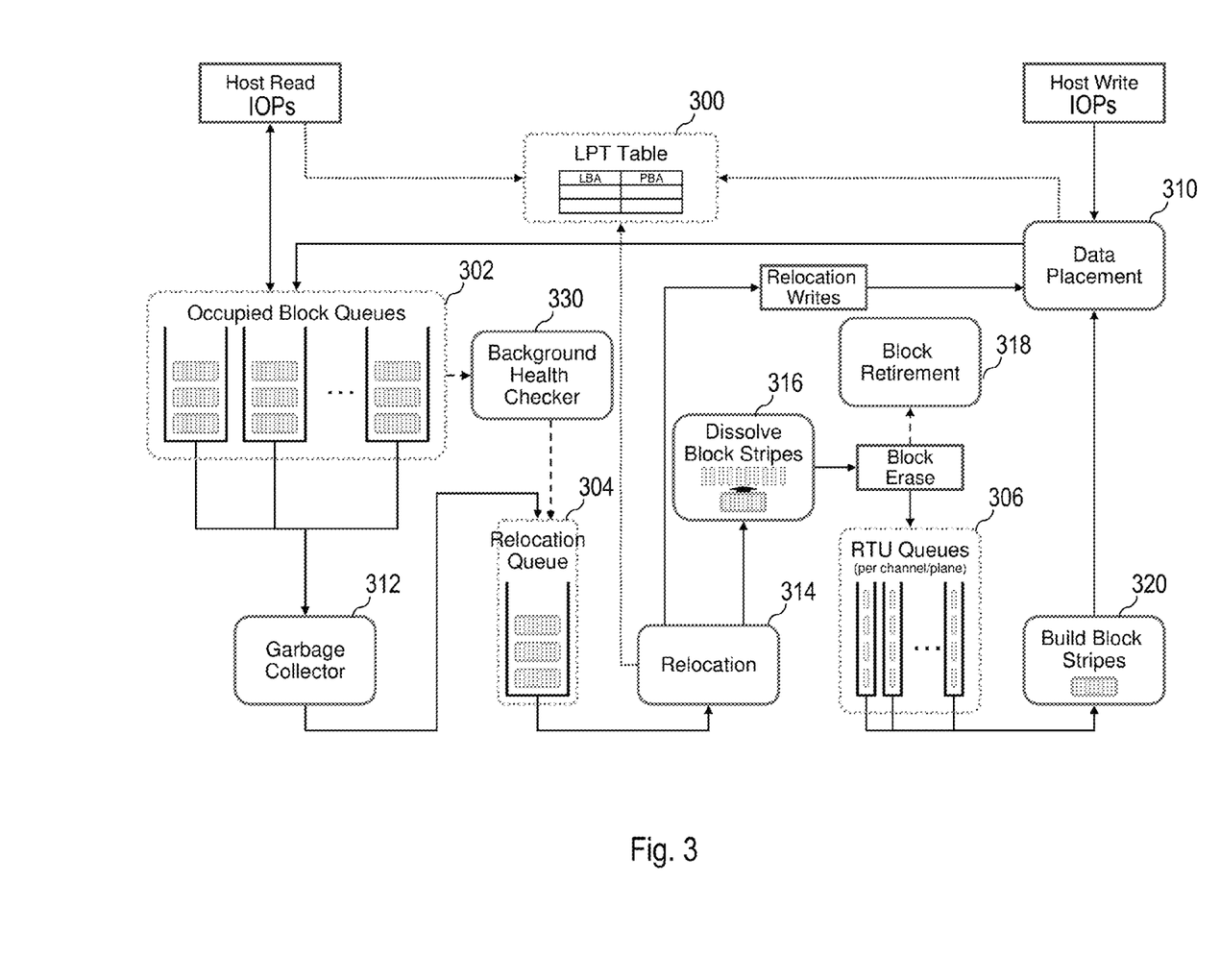
FIG. 3 is a high level flow diagram of the flash management functions and data structures employed in flash management in accordance with one embodiment.

As further shown in FIG. 3, the flash management functions executed on GPP 132 and/or flash controller 140 additionally include a background health checker 330. Background health checker 330, which operates independently of the demanded read and write IOPs of hosts such as processor systems 102, continuously determines one or more metrics of health for blocks belonging to block stripes recorded in occupied block queues 302. Based on the one or more of the health metrics, background health checker 330 places block stripes on relocation queue 304 for handling by relocation function 314. Key health metrics preferably monitored and recorded by background health checker relate to the bit error rate (BER) metrics observed for valid blocks and physical pages, and may include, for example, the worst page BER of each block, the mean page BER of each block, the rates of change of the worst page BER and mean page BER of each block, etc. In order to obtain the most accurate health estimate possible, health is preferably determined from an analysis of valid and invalid data, thereby ensuring that blocks containing almost entirely invalid data are fully analyzed to determine overall block health.

As noted above, in flash memory-based data storage systems, such as data storage system 120, it is desirable not only to maintain low average response times, but also to maintain relatively tight response time distributions across IOPs. In accordance with one aspect of the inventions disclosed herein, control logic, which can include one or more levels of controllers within data storage system 120 such as SMCs 123, RAID controllers 124, and/or GPP 132/flash controllers 140, can track latencies of pending IOPs to identify those having (or likely to have) long latencies. In accordance with another aspect of the inventions disclosed herein, the control logic can selectively reconstruct data requested by a read IOP and stored in a particular storage component (e.g., NAND flash memory storage device 152 or flash card 126) from other storage components in order to reduce the latency of the read IOP. In accordance with yet another aspect of the inventions disclosed herein, a lower level controller, such as a flash controller 140 or GPP 132, can also provide feedback to a higher level controller, such as a RAID controller 124, to cause the higher level controller to modify its behavior to improve response time distributions.

Figure 4:
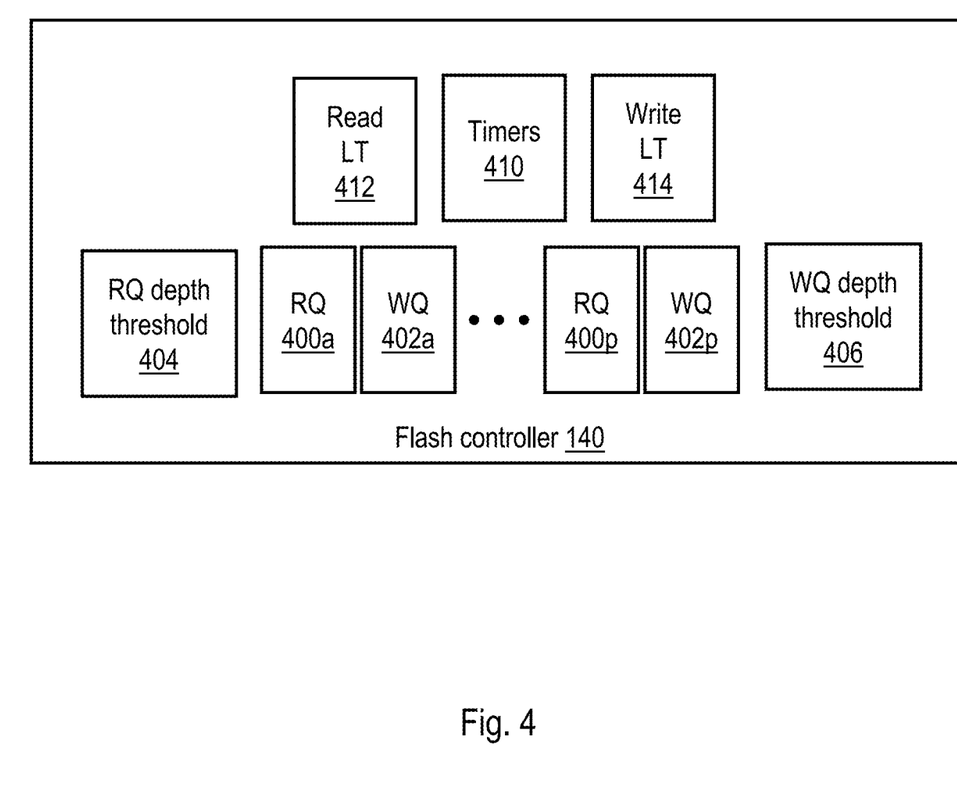
FIG. 4 is a more detailed block diagram of some of the data structures employed by control logic of a data storage system in accordance with one embodiment.

To support relatively tight response time distributions for the IOPs serviced by data storage system 120, control logic, which may include one or more levels of controllers, preferably implements data structures to enable tracking of response time (or latencies). For example, FIG. 4 depicts a detailed block diagram of data structures that may be employed by control logic (e.g., a flash controller 140) in accordance with one embodiment. Similar data structures may alternatively or additionally be implemented at higher levels of control logic, such as at RAID controllers 124 and/or SMCs 123.

In the illustrated embodiment, flash controller 140 implements a plurality of read queues (RQs) 400, which in this example includes RQs 400a-400p, as well as a corresponding plurality of write queues (WQs) 402, which in this example includes WQs 402a-402p. Each queue pair consisting of a RQ 400 and corresponding WQ 402 buffers pending reads and writes, respectively, that are to be serviced by a NAND flash memory storage device 152 coupled to a respective one of the channels (i.e., buses) of the associated NAND flash memory system 150. For example, in one embodiment, NAND flash memory system 150 includes 16 channels, and the associated flash controller 140 accordingly implements 16 RQ/WQ queue pairs. Flash controller 140 also preferably implements an RQ depth threshold register 404 and a WQ depth threshold register 406 that respectively indicate the fill depths (i.e., number of queued accesses) of a RQ 400 and of a WQ 402 that will trigger feedback notifications to a higher level controller, such as a RAID controller 124. Read and write IOPs, as well as reads and writes generated by the garbage collection process, are queued to the appropriate ones of RQs 400 and WQs 402 when received or generated by flash controller 140 and are removed when the indicated read or write access to the associated NAND flash memory system 150 is performed.

As further illustrated in FIG. 4, flash controller 140 preferably further implements a plurality of timers 410 that record the latency of each read or write access queued within RQs 400 and write queues 402. Flash controller 140 also preferably implements a read latency threshold register 412 and a write latency threshold register 414 that respectively indicate the read and write latencies (as measured by timers 410) that will trigger feedback notifications to a higher level controller, such as a RAID controller 124.

Figure 5:
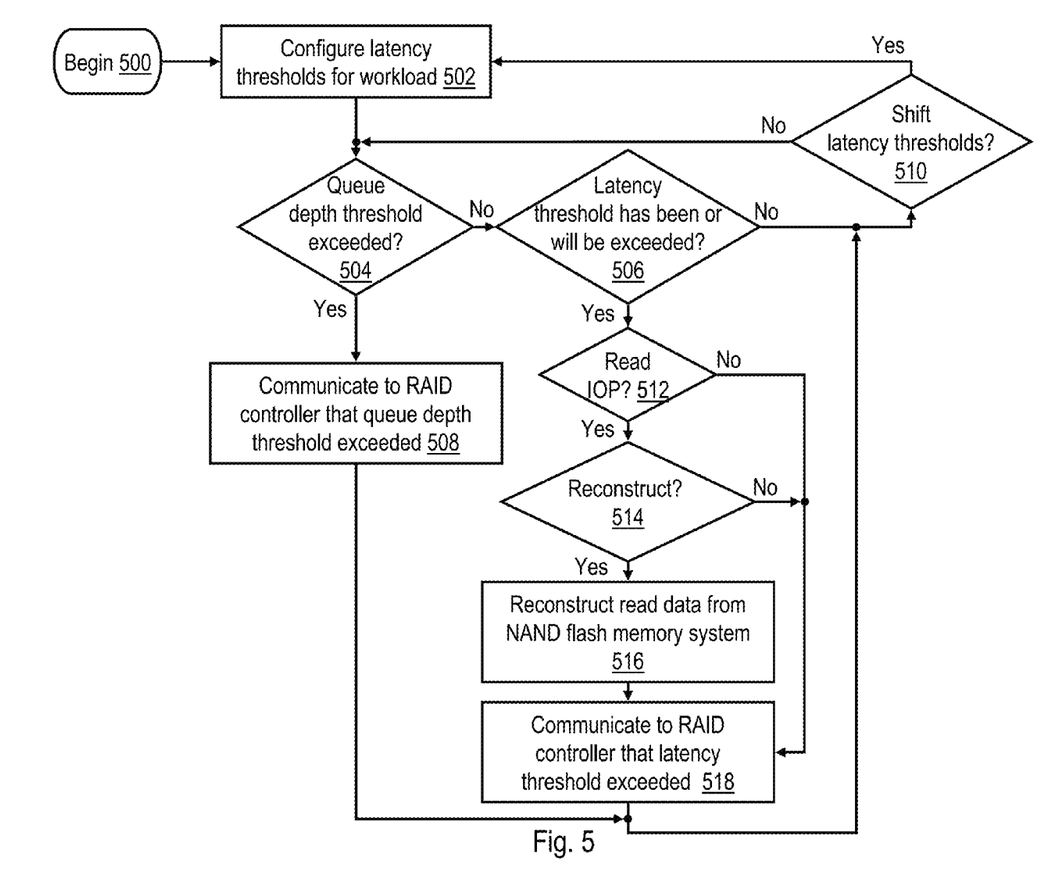
FIG. 5 is a high level logical flowchart of an exemplary process by which a lower level controller, such as a flash controller, manages servicing of IOPs to promote consistent response times in accordance with one embodiment.

With reference now to FIG. 5, there is illustrated a high level logical flowchart of an exemplary process by which a lower level controller manages servicing of reads and write IOPs to promote consistent response times in accordance with one embodiment. For ease of understanding, the illustrated process is described as being performed by flash controller 140. It should be understood, however, that in other embodiments, the process may alternatively be performed by or with the assistance of GPP 132 and/or at a higher level controller, such as a RAID controller 124.

The process of FIG. 5 begins at block 500 and then proceeds to block 502, which illustrates flash controller 140 configuring the read and write latency thresholds specified in read latency threshold register 412 and write latency threshold register 414, respectively. The read and write latency thresholds, which can be initialized, for example, in response to a command of system management controller(s) 123, are a function of the upper limits of the expected response time distributions for read and write IOPs in the current workload of data storage system 120. The process then proceeds from block 502 to blocks 504 and 506, which illustrates flash controller 140 monitoring to detect whether any queue depth threshold has been exceeded (block 504) and/or any latency threshold has been or will be exceeded (block 506).

In response to flash controller 140 detecting at block 504 that a queue depth threshold as specified for RQs 400 and WQs 402 by RQ depth threshold register 404 and WQ depth threshold register 406, respectively, has been exceeded, the process of FIG. 5 passes from block 504 to block 508. Block 508 illustrates flash controller 140 communicating to a higher level controller, such as a RAID controller 124, that the queue depth threshold has been exceeded. This feedback notification, which preferably specifies the type of queue (RQ 400 or WQ 402) and the lane with which the queue is associated, can be communicated between the lower level controller and the higher level controller, for example, via push communication, pull communication, or polling. As discussed further below, in response to the feedback notification, the higher level controller (e.g., RAID controller 124) can modify its behavior to temporarily reduce the workload of the lower level controller (e.g., flash controller 140) and thus improve (i.e., tighten) the distribution of response times for at least the flash card 126 that provided the feedback. Following block 508, the process of FIG. 5 proceeds to block 510, which is discussed below.

Returning to block 506, flash controller 140 may detect that a read latency threshold or a write latency threshold has been exceeded by comparison of the thresholds specified by read latency threshold register 412 and write latency threshold 414 to the values of timers 410. In at least some embodiments, at block 506 flash controller 140 may additionally detect whether a read or write latency threshold will be exceeded (or is likely to be exceeded) in advance of the value of a timer 410 exceeding the relevant threshold based, for example, on the latencies of older read and write accesses in the same RQ/WQ queue pair and/or the occurrence of other events that affect latency, such as a pending garbage collection operation targeting a block stripe containing the target page of a read or write access. In response to flash controller 140 detecting at block 506 that a latency threshold has been or will be exceeded, the process of FIG. 5 passes from block 506 to block 512 and following blocks. In response to flash controller 140 failing to detect that a queue depth threshold has been exceeded at block 504 or that a latency threshold has been or will be exceeded at block 506, the process of FIG. 5 proceeds to block 510, which is described below.

Referring now to block 512, flash controller 140 determines at block 512 whether or not the access for which the associated latency threshold has been or will be exceeded is a read IOP. If not, the process proceeds from block 512 to block 518, which is described below. If, however, flash controller 140 determines at block 512 that the access for which the associated latency threshold has been or will be exceeded is a read IOP, flash controller 140 further determines at block 514 whether to reconstruct the read data requested by the read IOP from other NAND flash memory storage devices 152. For example, flash controller 140 can reconstruct the a target page of read data in the absence of any data error in the target page utilizing the parity information and the other (i.e., non-target) pages of the page stripe. Of course, in the event the target page does contain data error(s), the target data page of a read IOP may also be reconstructed in like manner.

In one preferred embodiment, flash controller 140 may make the determination whether or not to reconstruct the read data as illustrated at block 514 based on multiple criteria. These criteria can include, for example, the latency benefit expected to be obtained by reconstructing the target page of read data rather than waiting for the read IOP to complete normally. In addition, the criteria can include the potential undesirable latency effects of the read amplification inherent in reconstructing the read data (e.g., assuming the use of RAID 5, instead of one read, initiating N reads to N different NAND flash memory storage devices 152, where N is the number of data pages in the page stripe and N+1 is the total page stripe length). Further, flash controller 140 may consider the anticipated latency or latencies of the events (e.g., an erase operation) delaying completion of the read IOP and whether or not reconstructing the read data would cause the RQ depth threshold to be exceeded for any of RQs 400.

In response to a negative determination at block 514, the process of FIG. 5 passes from block 514 to block 518, which is described below. If, however, flash controller 140 determines at block 514 that it should reconstruct the read data requested by the read IOP, flash controller 140 causes the read data to be reconstructed from multiple storage components (e.g., NAND flash memory storage devices 152) of the associated NAND flash memory system 150, as depicted at block 516. In at least some embodiments, flash controller 140 initiates the reconstruction of the read data and then cancels which ever one of the original read IOP and the reconstruction process that finishes last.

In addition, as shown at block 518, flash controller 140 communicates to a higher level controller, such as a RAID controller 124, that a latency threshold has been or will be exceeded. This feedback notification, which preferably specifies the type of queue (RQ 400 or WQ 402) and the lane with which the queue is associated, can be communicated between the lower level controller and the higher level controller, for example, via push communication, pull communication or polling. As noted above, in response to the feedback notification, the higher level controller (e.g., RAID controller 124) can modify its behavior to temporarily reduce the workload of the lower level controller (e.g., flash controller 140) and thus improve (i.e., tighten) the distribution of response times of at least the flash card 126 that provided the feedback. The process then passes from block 518 to block 510.

Block 510 depicts flash controller 140 determining whether or not to shift (i.e., increase or decrease) the read latency threshold and/or the write latency threshold specified in read latency threshold register 412 and write latency threshold register 414, respectively. For example, flash controller 140 may make the determination illustrated at block 510 based on observed access latencies measured by timers 410 indicating a shift in the average, worst case, and/or best case response times and/or in response to one or more commands received by SMCs 123. In response to a determination to shift the read latency threshold and/or write latency threshold, the process returns to block 502, which illustrates flash controller 140 configuring the read latency threshold and/or write latency threshold for the current workload of data storage system 120. Following block 502 or in response to a negative determination at block 510, the process of FIG. 5 returns to blocks 504-506, which illustrates flash controller 140 continuing its monitoring as described above.

Figure 6:
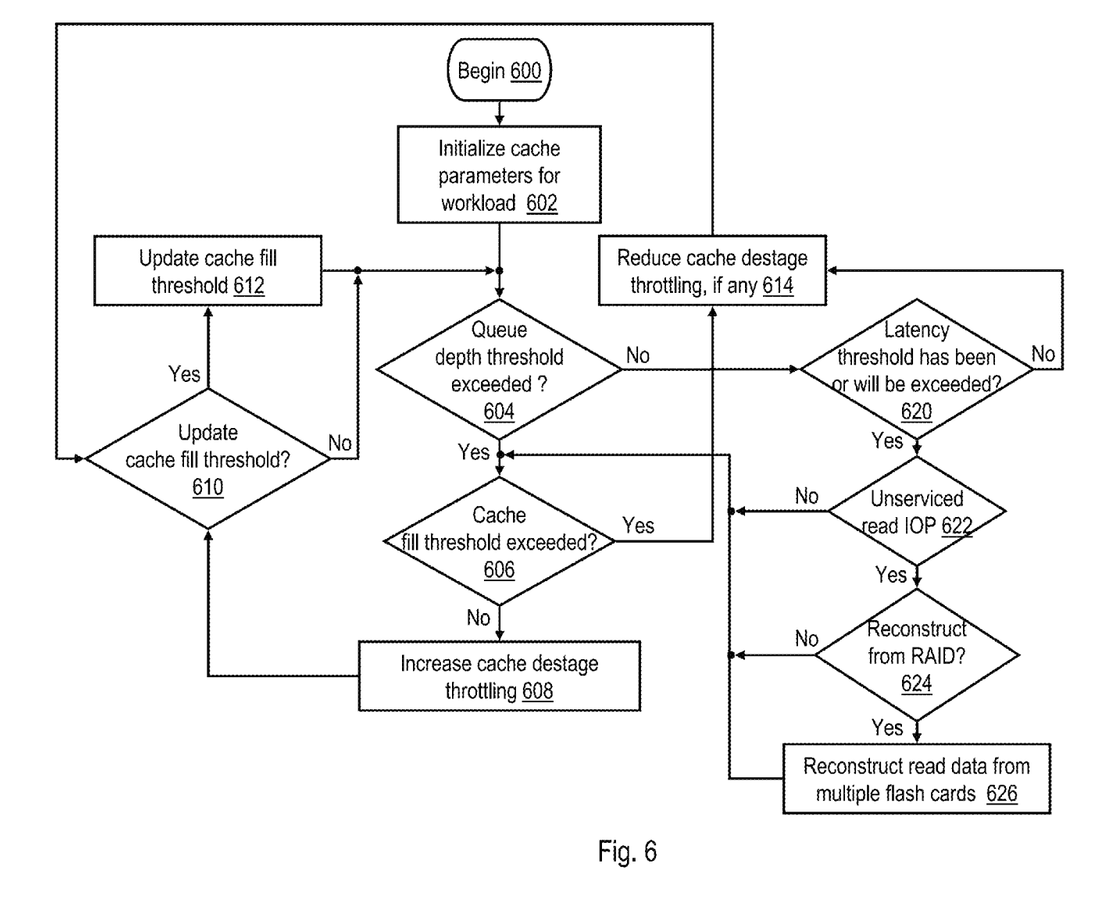
FIG. 6 is a high level logical flowchart of an exemplary process by which a higher level controller, such as a RAID controller, manages servicing of IOPs to promote consistent response times in accordance with one embodiment.

Referring now to FIG. 6, there is depicted a high level logical flowchart of an exemplary process by which a higher level controller manages servicing of IOPs to promote consistent response times in accordance with one embodiment. For ease of understanding, the illustrated process is described as being performed by RAID controller 124. It should be understood, however, that in other embodiments, the process may alternatively be performed by or with the assistance of a higher level controller, such as a SMC 123.

The process of FIG. 6 begins at block 600 and then proceeds to block 602, which illustrates a RAID controller 124 configuring one or more parameters for its cache 125 for the current workload. In various implementations, RAID controller 124 may configure the cache parameters based on default or historical values and/or in response to one or more commands from SMCs 123. In one embodiment, the cache parameters include a cache fill threshold for cache 125, where the cache fill threshold specifies a cache fill level that, when reached, triggers RAID controller 124 to begin destaging data buffered within cache 125 to flash cards 126 through issuing write IOPs. The cache fill threshold may be expressed, for example, as an absolute amount of data or as a percentage of the storage capacity of cache 125. In general, RAID controller 124 preferably initially configures the cache fill threshold to a relatively low figure so that cache 125 has sufficient unused capacity to absorb the write data of a string of K write IOPs without becoming full. Alternatively or additionally, at block 602 RAID controller 124 may initialize a destage rate parameter that controls a rate at which RAID controller 124 destages data from cache 125 to flash cards 126. In various embodiments, flash controller 124 may configure global cache parameters applicable to all flash cards 126 or may alternatively configure individual cache parameters for each flash card 126. As described below, RAID controller 124 may thereafter increase or decrease the cache fill threshold and/or the destage rate parameter in order to reduce the distribution of IOP response times for one or more flash cards 126.

The process of FIG. 6 proceeds from block 602 to blocks 604 and 620, which illustrate RAID controller 124 monitoring for receipt of one or more feedback notifications from a flash card 126 indicating that a queue depth threshold has been exceeded (block 604) or that a latency threshold has been exceeded (block 620). In response to a determination at block 604 that a feedback notification has been received indicating that a queue depth threshold of one of flash cards 126 has been exceeded, RAID controller 124 further determines at block 606 whether or not the cache fill threshold applicable to the flash card 126 providing the feedback notification has been exceeded. In response to a positive determination at block 606, the process passes to block 614, which is described below. However, in response to a negative determination at block 606, flash controller 124 increases cache destage throttling to at least the flash card 126 providing the feedback notification by decreasing the destage rate parameter applicable to at least that flash card 126 (block 608). By decreasing the destage rate to at least the flash card 126 providing the feedback notification, the IOPs pending at the flash card 126 will be temporarily reduced, meaning the flash card 126 will be able to tighten its distribution of response times.

The process proceeds from block 608 to block 610, which illustrates RAID controller 124 determining whether or not to update the cache fill threshold applicable to at least the flash card 126 providing the feedback notification. Increasing the cache fill threshold has the effect of reducing the number of pending IOPs at the flash card 126 and therefore tightening its distribution of response times, while decreasing the cache fill threshold has the opposite effect. RAID controller 124 can make the determination illustrated at block 610 based on, for example, the number of or rate of receipt of write IOPs in the current workload of data storage system 120. In response to a determination that the cache fill threshold should be updated, RAID controller 124 updates the cache fill threshold applicable to the flash controller 124 providing the feedback notification (block 612). Following block 612 or in response to a negative determination at block 610, the process of FIG. 6 returns to blocks 604 and 620, which have been described.

Referring again to blocks 604 and 620, in response to RAID controller 124 determining that it has not received a feedback notification from a flash card 126 indicating that a queue depth threshold or a latency threshold has been exceeded, the process passes to block 614. Block 614 depicts RAID controller 124, if applicable, reducing cache destage throttling for one or more flash cards 126 that previously provided feedback notification(s) to RAID controller 124 by increasing the destage rate parameter applicable to such flash cards 126 (block 614). Thus, once the busyness of one or more flash cards 126 subsides, RAID controller 124 can adjust the destage rate parameter toward a higher value favoring a lower cache fill level. Thereafter, the process passes to block 610 and following blocks, which have been described.

Returning to block 620, in response to RAID controller 124 determining that it has received a feedback notification from a flash card 126 indicating that a latency threshold has been or will be exceeded, the process passes from block 620 to block 622. Block 622 illustrates RAID controller 124 determining whether or not the feedback notification relates to an unserviced read IOP. If not, the process passes to block 606 and following blocks, which have been described. If, on the other hand, RAID controller 124 determines at block 622 that the feedback notification relates to an unserviced read IOP, RAID controller 124 determines whether or not to reconstruct the read data requested by the read IOP from the RAID stripe distributed across multiple flash cards 126. In this manner, the read IOP can be serviced without accessing the flash card 126 that has notified RAID controller 124 that it is temporarily experiencing high latency.

In one preferred embodiment, RAID controller 124 may make the determination illustrated at block 624 based on multiple criteria. These criteria can include, for example, the latency benefit expected to be obtained by reconstructing the target page of read data rather than waiting for the long latency read to complete normally. In addition, the criteria can include the undesirable latency effects of the read amplification inherent in reconstructing the read data (e.g., assuming the use of RAID 5, instead of one read, initiating M reads to M different flash cards 126, where M is the number of blocks in the RAID stripe and M+1 is the total page stripe length). Further, RAID controller 124 may consider whether reconstructing the read data would be likely to cause the RQ depth thresholds to be exceeded for any of flash cards 126.

In response to RAID controller 124 determining that it should reconstruct the read data requested by the read IOP, RAID controller 124 causes the read data to be reconstructed from multiple storage components (e.g., flash cards 126), as depicted at block 626. In at least some embodiments, flash controller 140 initiates the reconstruction of the read data and then cancels which ever one of the original read IOP and the reconstruction reads that finishes last. Following block 626 or in response to a negative determination at block 624, the process passes to block 606 and following blocks, which have been described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, in at least one embodiment, a data storage system includes a higher level controller, a lower level controller, and a plurality of storage components including a particular storage component. Data is stored within the data storage system utilizing at least one level of striping across the plurality of storage components. Latencies of input/output operations (IOPs) requesting access to the data stored within the data storage system are monitored. In absence of a data error and in response to determining that a latency of a read IOP requesting read data stored in the particular storage component exceeds or will exceed a latency threshold, the read IOP is serviced by reconstructing the read data from storage components among the plurality of storage components other than the particular storage component. The lower level controller also provides feedback to the higher level controller to cause the higher level controller to reduce IOPs directed to at least the particular storage component.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transitory propagating media per se.

In addition, although embodiments have been described that include use of a NAND flash memory, it should be appreciated that embodiments of the present invention can also be used with any other type of non-volatile random access memory (NVRAM).

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method in a data storage system including a higher level controller and a lower level controller, the method comprising:
    storing data within the data storage array utilizing at least one level of striping across a plurality of storage components including a particular storage component;
    monitoring latencies of input/output operations (IOPs) requesting access to the data stored within the data storage array;
    in absence of a data error and in response to determining that a latency of a read IOP requesting read data stored in the particular storage component exceeds or will exceed a latency threshold, determining whether or not to reconstruct the read data from storage components among the plurality of storage components other than the particular storage component, wherein the determining is based on multiple criteria including (1) latency effects of read amplification on the plurality of storage components other than the particular storage component caused by reconstructing the read data and at least one criterion from a set including (2) a latency benefit expected to be obtained by reconstructing the read data and (3) whether reconstructing the read data would cause a read queue depth threshold to be exceeded for any of the plurality of storage components other than the particular storage component;
    in response to determining to not reconstruct the read data, servicing the read IOP by accessing the read data from the particular storage component;
    in response to determining to reconstruct the read data, servicing the read IOP by reconstructing the read data from storage components among the plurality of storage components other than the particular storage component; and
    the lower level controller providing feedback to the higher level controller to cause the higher level controller to reduce IOPs directed to at least the particular storage component.

2. The method of claim 1, wherein:
    the high level controller has an associated cache; and
    the method further comprising:
        in response to the feedback, the higher level controller reducing a rate of destaging data from the cache to the plurality of storage components.

3. The method of claim 1, wherein the feedback indicates at least one of the latency threshold and a queue depth threshold has been exceeded.

4. The method of claim 1, wherein the reconstructing includes the lower level controller reconstructing the read data from multiple flash modules.

5. The method of claim 1, wherein the reconstructing includes the higher level controller reconstructing the read data from multiple flash cards.

6. The method of claim 1, and further comprising dynamically varying the latency threshold during operation of the data storage system.

7. The method of claim 1, wherein the storing includes:
    storing data utilizing both a first level of striping across the plurality of storage components and a second level of striping across a plurality of storage component groups, wherein the plurality of storage components forms one of the plurality of storage component groups, and wherein the lower level controller controls read and write access to data within the plurality of storage components and the higher level controller controls read and write access to data within the plurality of storage component groups.

8. A data storage system, comprising:
    control logic configured to be coupled to a data storage array including a plurality of storage components including a particular storage component, wherein the control logic includes a higher level controller and lower level controller and the control logic is configured to perform:
        storing data within the data storage array utilizing at least one level of striping across a plurality of storage components including a particular storage component;
        monitoring latencies of input/output operations (IOPs) requesting access to the data stored within the data storage array;
        in absence of a data error and in response to determining that a latency of a read TOP requesting read data stored in the particular storage component exceeds or will exceed a latency threshold, determining whether or not to reconstruct the read data from storage components among the plurality of storage components other than the particular storage component, wherein the determining is based on multiple criteria including (1) latency effects of read amplification on the plurality of storage components other than the particular storage component caused by reconstructing the read data and at least one criterion from a set including (2) a latency benefit expected to be obtained by reconstructing the read data and (3) whether reconstructing the read data would cause a read queue depth threshold to be exceeded for any of the plurality of storage components other than the particular storage component;

in response to determining to not reconstruct the read data, servicing the read IOP by accessing the read data from the particular storage component;

in response to determining to reconstruct the read data, servicing the read IOP by reconstructing the read data from storage components among the plurality of storage components other than the particular storage component; and the lower level controller providing feedback to the higher level controller to cause the higher level controller to reduce IOPs directed to at least the particular storage component.

9. The data storage system of claim 8, wherein:
the high level controller has an associated cache; and
the higher level controller, responsive to the feedback, reduces a rate of destaging data from the cache to the plurality of storage components.

10. The data storage system of claim 8, wherein the feedback indicates at least one of the latency threshold and a queue depth threshold has been exceeded.

11. The data storage system of claim 8, wherein the reconstructing includes the lower level controller reconstructing the read data from multiple flash modules.

12. The data storage system of claim 8, wherein the reconstructing includes the higher level controller reconstructing the read data from multiple flash cards.

13. The data storage system of claim 8, wherein the control logic dynamically varies the latency threshold during operation of the data storage array.

14. The data storage system of claim 8, and further comprising the data storage array coupled to the control logic.

15. A program product, comprising:
a storage device; and
program code stored in the storage device, wherein the program code, when executed by a control logic including a higher level controller and a lower level controller, causes the control logic to perform:
storing data within a data storage array utilizing at least one level of striping across a plurality of storage components including a particular storage component;
monitoring latencies of input/output operations (IOPs) requesting access to the data stored within the data storage array;
in absence of a data error and in response to determining that a latency of a read IOP requesting read data stored in the particular storage component exceeds or will exceed a latency threshold, determining whether or not to reconstruct the read data from storage components among the plurality of storage components other than the particular storage component, wherein the determining is based on multiple criteria including (1) latency effects of read amplification on the plurality of storage components other than the particular storage component caused by reconstructing the read data and at least one criterion from a set including (2) a latency benefit expected to be obtained by reconstructing the read data and (3) whether reconstructing the read data would cause a read queue depth threshold to be exceeded for any of the plurality of storage components other than the particular storage component;
in response to determining to not reconstruct the read data, servicing the read IOP by accessing the read data from the particular storage component;
in response to determining to reconstruct the read data, servicing the read IOP by reconstructing the read data from storage components among the plurality of storage components other than the particular storage component; and
the lower level controller providing feedback to the higher level controller to cause the higher level controller to reduce IOPs directed to at least the particular storage component.

16. The program product of claim 15, wherein:
the high level controller has an associated cache; and
the program code, when executed, further causes the control logic to perform:
in response to the feedback, the higher level controller reducing a rate of destaging data from the cache to the plurality of storage components.

17. The program product of claim 15, wherein the feedback indicates at least one of the latency threshold and a queue depth threshold has been exceeded.

18. The program product of claim 15, wherein the reconstructing includes the lower level controller reconstructing the read data from multiple flash modules.

19. The program product of claim 15, wherein the reconstructing includes the higher level controller reconstructing the read data from multiple flash cards.

20. The program product of claim 15, wherein the program code, when executed, further causes the control logic to perform:
dynamically varying the latency threshold during operation of the data storage array.

* * * * *